(12) United States Patent
Tanaka et al.

(10) Patent No.: US 6,885,681 B2
(45) Date of Patent: Apr. 26, 2005

(54) BIT RATE CONVERTER WITH CONTROLLED STUFFING RATE

(75) Inventors: Hiroaki Tanaka, Tokyo (JP); Kenichi Nomura, Tokyo (JP); Yasushi Hara, Tokyo (JP)

(73) Assignee: NEC Corporation, Tokyo (JP)

(*) Notice: Subject to any disclaimer, the term of this patent is extended or adjusted under 35 U.S.C. 154(b) by 819 days.

(21) Appl. No.: 09/798,939

(22) Filed: Mar. 6, 2001

(65) Prior Publication Data

US 2001/0021201 A1 Sep. 13, 2001

(30) Foreign Application Priority Data

Mar. 7, 2000 (JP) ........................... 2000-062599

(51) Int. Cl.[7] ............................................. H04J 3/06
(52) U.S. Cl. .................................................. 370/503
(58) Field of Search .......................... 370/412, 429, 370/503, 505, 506, 516, 518, 543, 545

(56) References Cited

U.S. PATENT DOCUMENTS

| | | | |
|---|---|---|---|
| 4,920,547 A | | 4/1990 | Murakami |
| 5,131,013 A | * | 7/1992 | Choi ........................... 370/506 |
| 5,276,688 A | * | 1/1994 | Urbansky ...................... 370/465 |
| 5,539,785 A | * | 7/1996 | Burch et al. .................. 370/506 |
| 5,548,624 A | * | 8/1996 | Yoshida ........................ 370/505 |
| 5,563,891 A | * | 10/1996 | Wang ........................... 370/505 |
| 5,619,506 A | * | 4/1997 | Burch et al. .................. 370/506 |
| 5,638,411 A | * | 6/1997 | Oikawa ......................... 370/505 |
| 2001/0022826 A1 | * | 9/2001 | Rude ........................... 370/516 |
| 2003/0133475 A1 | * | 7/2003 | Solheim et al. ............... 370/532 |

FOREIGN PATENT DOCUMENTS

| | | |
|---|---|---|
| JP | 63-167541 | 7/1988 |
| JP | 5-145510 | 6/1993 |
| JP | 6-46084 | 2/1994 |
| JP | 6-77923 | 3/1994 |
| JP | 6-268692 | 9/1994 |
| WO | WO 97/44923 | 11/1997 |

* cited by examiner

Primary Examiner—Chi Pham
Assistant Examiner—Anh-Vu Ly
(74) Attorney, Agent, or Firm—McGinn & Gibb, PLLC

(57) ABSTRACT

A bit rate converter capable of avoiding slip of data in a memory for use in bit rate adjustment is disclosed. A phase comparator compares a write address and a read address of the memory to produce a phase difference. The write address is ahead of the read address in the memory. A stuffing rate controller selects one of a plurality of preset fixed stuffing rates depending on the phase difference. A stuff pulse inserter inserts a stuff pulse into readout data from the memory at the selected stuffing rate. When normally operating, a normal fixed stuffing rate is selected. When the phase difference is small than a lowest threshold value, a higher fixed stuffing rate is selected. When the phase difference is greater than a highest threshold value, a lower fixed stuffing rate is selected.

17 Claims, 11 Drawing Sheets

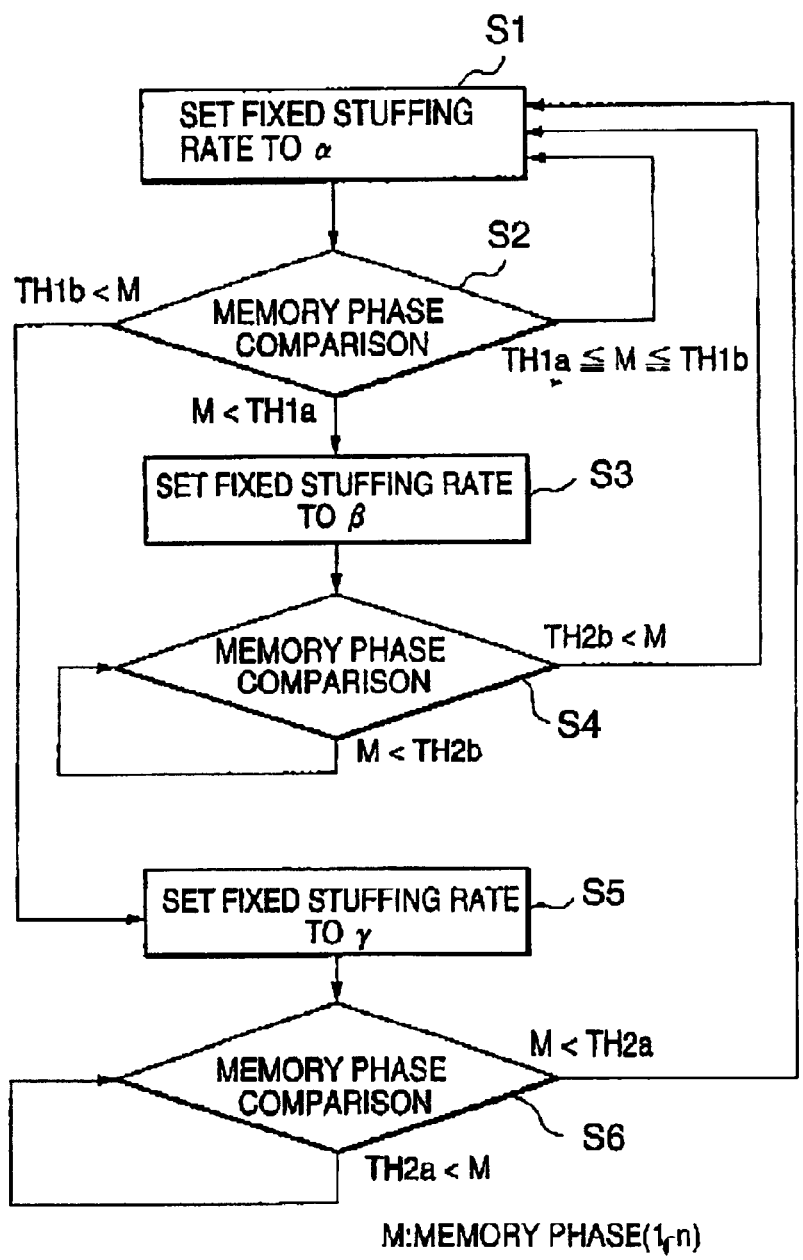

(WHEN $\alpha = 1/2$)

(WHEN $\alpha=1/2, \beta=1$)

(WHEN $\alpha=1/2, \gamma=0$)

# BIT RATE CONVERTER WITH CONTROLLED STUFFING RATE

BACKGROUND OF THE INVENTION

1. Field of the Invention

The present invention relates to a bit rate converter for converting the fixed bit rate of an input signal to a different bit rate.

2. Description of the Related Art

Bit rate converters have been widely used in transmission systems and digital data processing systems. Consider the case where an input signal of a fixed bit rate is converted to a higher bit rate signal structured in frames and having an overhead (OH) and a redundancy code included therein. The input signal is written on a buffer memory according to a write clock of the fixed bit rate. The written signal is read out in frames from the buffer memory according to a read clock of the higher bit rate while adding an overhead (OH) and a redundancy code thereto. At a receiver end, the overhead and redundancy code are terminated and the high bit rate of the received data is converted to the original fixed bit rate.

In addition, there have been known pulse stuffing techniques to insert one or more stuff pulses in the frames based on a phase difference between a write timing and a read timing achieve bit rate adjustment. For example, see U.S. Pat. Nos. 4,920,547 and 5,276,688.

In general, the phase difference is monitored by a phase comparator comparing the write address and the read address on the buffer memory. The phase difference varies in a period of the frame. More specifically, when the written data are read out from the buffer memory according to the read clock of the higher bit rate, the phase difference becomes smaller because the frequency of the read clock is higher than that of the write clock. When the read clock stops to insert the overhead and redundancy code, the phase difference increases sharply because the data writing is continuously performed according to the write clock. Accordingly, the phase difference varies in such a manner from frame to frame (see FIG. 5B).

FIG. 5B shows a time-varying phase difference in the case of n-bit butter memory used for bit rate adjustment. As shown in FIG. 5B, when the input signal is normally received, a phase difference varies in a period of one frame within a predetermined proper range having a center phase difference of n/2. In such a case, the bit rate adjustment is normally performed without any error or data slipping.

In the event that the write clock of the fixed bit rate stops due to some failure, the phase difference reduces sharply because the readout operation is continuously performed according to the read clock of the higher bit rate. Finally, the phase difference becomes zero, resulting in underflow status (see FIG. 6B).

Contrarily, there are cases where the phase difference reaches the depth (n-bit) of the buffer memory due to jitter or wander of the write clock, resulting in overflow status.

According to the conventional circuit, however, in a case of such an overflow or underflow status, the phase difference is forced to be reset to the initial value of n/2. Such a reset operation causes the data written in the buffer memory to be cleared. Therefore, some data slips away from the buffer memory, leading to error status.

SUMMARY OF THE INVENTION

An object of the present invention is to provide a bit rate converter and a control method thereof, which are capable of avoiding slip of data in a memory for use in bit rate adjustment.

According to the present invention, a bit rate converter includes: a memory for storing input data of a fixed bit rate; a memory controller for controlling the memory such that the input data are sequentially written into the memory according to a write clock and written data are sequentially read out from the memory according to a read clock having a frequency different from that of the write clock; a phase comparator for comparing a write address and a read address of the memory to produce a phase difference, wherein the write address is ahead of the read address in the memory: a stuffing rate controller for selecting one of a plurality of preset fixed stuffing rates depending on the phase difference; and a stuff pulse inserter for inserting a stuff pulse into readout data from the memory at the selected stuffing rate.

The plurality of preset fixed stuffing rates may include a normal fixed stuffing rate, at least one higher fixed stuffing rate, and at least one lower fixed stuffing rate, wherein the stuffing rate controller normally selects the normal fixed stuffing rate, selects a higher fixed stuffing rate when the phase difference is small than a first threshold value, and selects a lower fixed stuffing rate when the phase difference is greater than a second threshold value that is greater than the first threshold value.

The stuffing rate controller may be previously provided with a plurality of threshold values including a lowest threshold value and a highest threshold value within a predetermined range of the memory, wherein the plurality of preset fixed stuffing rates consists of a normal fixed stuffing rate, a higher fixed stuffing rate, and a lower fixed stuffing rate, wherein the stuffing rate controller normally selects the normal fixed stuffing rate, selects the higher fixed stuffing rate when the phase difference is small than the lowest threshold value, and selects the lower fixed stuffing rate when the phase difference is greater than the highest threshold value.

The stuffing rate controller may be previously provided with a plurality of threshold values including a lowest threshold value and a highest threshold value within a predetermined range of the memory, wherein the stuffing rate controller forcefully resets the memory and the memory controller when the phase difference exceeds one of the lowest and highest threshold values.

The plurality of threshold values may further include a lower threshold value and a higher threshold value within the predetermined range of the memory, wherein the plurality of preset fixed stuffing rates consists of a normal fixed stuffing rate, a higher fixed stuffing rate, and a lower fixed stuffing rate, wherein the stuffing rate controller normally selects the normal fixed stuffing rate, selects the higher fixed stuffing rate when the phase difference is small than the lower threshold value, and selects the lower fixed stuffing rate when the phase difference is greater than the higher threshold value.

According to an embodiment of the present invention, a bit rate converter includes: a memory for storing input data of a fixed bit rate; a write address counter for counting a write address according to a write clock of the fixed bit rate; a read address counter for counting a read address according to a read clock; a memory controller for controlling the memory such that the input data are sequentially written into the memory according to the write address and written data are sequentially read out from the memory according to the read address; a phase comparator for comparing the write address and the read address of the memory to produce a phase difference, wherein the write address is ahead of the read address in the memory; a stuffing rate controller for` selecting one of a plurality of preset fixed stuffing rates depending on the phase difference; a stuff pulse inserter for inserting a stuff pulse into readout data in frames from the memory at the selected stuffing rate; and a read clock generator for generating the read clock by decimating a clock pulse corresponding to the stuff pulse from a clock of a higher bit rate.

According to another aspect of the present invention, a control method of a bit rate converter having a memory for storing input data of a fixed bit rate; and a memory controller for controlling the memory such that the input data are sequentially written into the memory according to a write clock and written data are sequentially read out from the memory according to a read clock, the method includes the steps of: a) comparing a write address and a read address of the memory to produce a phase difference, wherein the write address is ahead of the read address in the memory, b) selecting one of a plurality of preset fixed stuffing rates depending on the phase difference; and c) inserting a stuff pulse into readout data from the memory at the selected stuffing rate.

The plurality of preset fixed stuffing rates may include a normal fixed stuffing rate, at least one higher fixed stuffing rate, and at least one lower fixed stuffing rate. In this case, the step (b) may include the steps of: when the input data is normally received, selecting the normal fixed stuffing rate; when the phase difference is small than a first threshold value, selecting a higher fixed stuffing rate; and when the phase difference is greater than a second threshold value that is greater than the first threshold value, selecting a lower fixed stuffing rate.

The plurality of preset fixed stuffing rates may include a normal fixed stuffing rate, a higher fixed stuffing rate, and a lower fixed stuffing rate, wherein the method further includes the step of: previously storing a plurality of threshold values including a lowest threshold value, a lower threshold value, a higher threshold value, and a highest threshold value within a predetermined range of the memory. The step (b) may include the steps of: b.1) when the input data is normally received, selecting the normal fixed stuffing rate; b.2) when the phase difference is small than the lowest threshold value, selecting the higher fixed stuffing rate; and b.3) when the phase difference is greater than the highest threshold value, selecting the lower fixed stuffing rate.

The step (b) may further include the steps of: b.4) when the phase difference exceeds the higher threshold value after the higher fixed stuffing rate is selected at the step (b.2), selecting the normal fixed stuffing rate; and b.5) when the phase difference is lower than the lower threshold value after the lower fixed stuffing rate is selected at the step (b.3), selecting the normal fixed stuffing rate.

As described above, a phase difference is monitored at all times and the stuff pulse insertion is normally executed at the normal fixed stuffing rate. When the phase difference is about to underflow, the stuff pulse insertion is executed at the higher fixed stuffing rate. When the phase difference is about to overflow, the stuff pulse insertion is executed at the lower fixed stuffing rate. Accordingly, by controlling the fixed stuffing rate as described above, the phase difference can be continuously restored to a proper range without the need of memory reset. In other words, the data stored in the memory can be prevented from destroying due to memory reset, resulting in improved robustness.

Further, in the event that a very large variation in phase difference occurs such that selection of fixed stuffing rates cannot cope with the variation, the phase difference is reset back to proper values immediately. In this case, although data stored in the memory are destroyed, the circuit operation can be restored immediately after such a very large noise causes an unusual change of the phase difference, resulting in enhanced reliability.

BRIEF DESCRIPTION OF THE DRAWINGS

FIG. 4 is a flow chart showing an operation of hanging a stuffing rate according to the first embodiment;

DESCRIPTION OF THE PREFERRED EMBODIMENTS

First Embodiment

Figure 1:
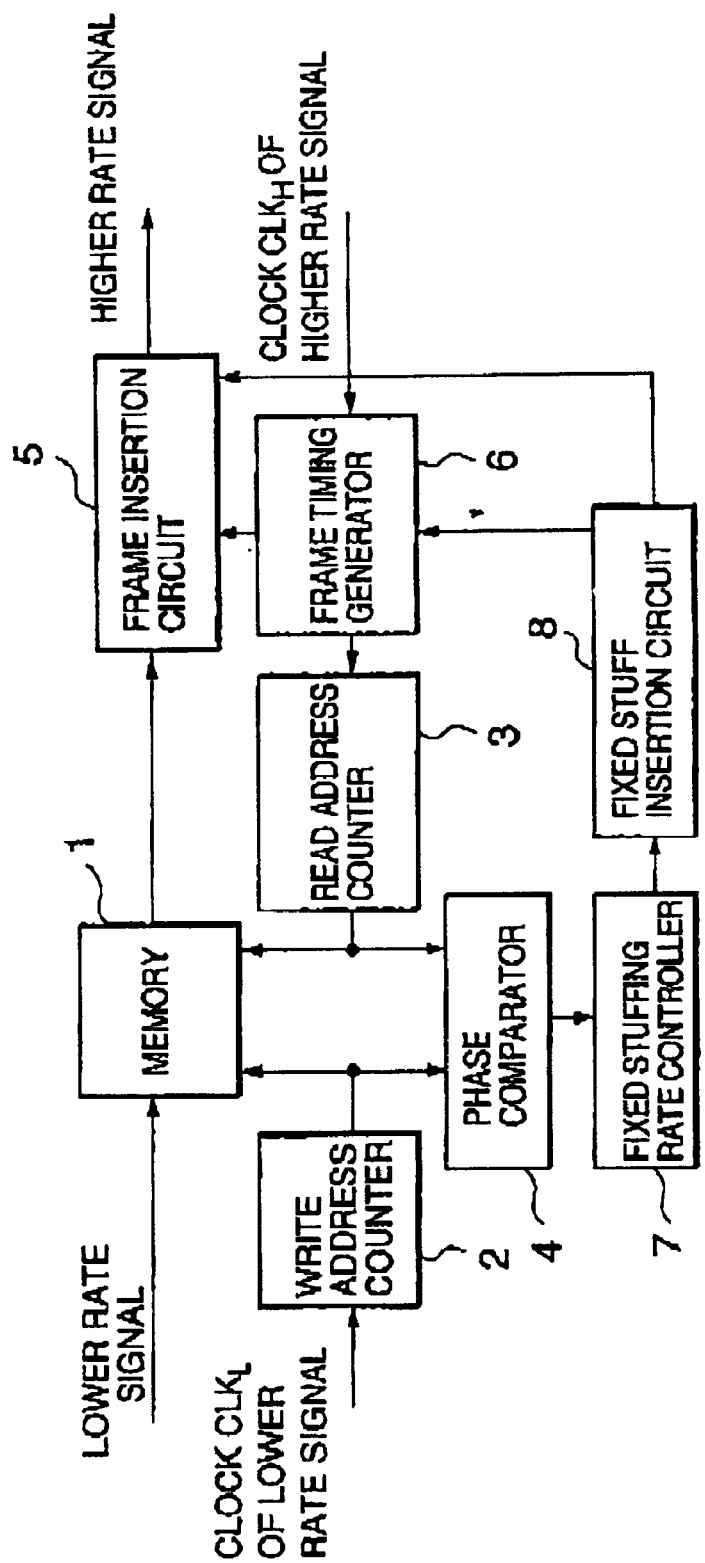
FIG. 1 is a block diagram showing a bit rate converter according to a first embodiment of the present invention.

Referring to FIG. 1, a bit rate converter according to a first embodiment is provided with a memory 1, a write address counter 2, a read address counter 3, a phase comparator 4, a frame insertion circuit 5, and a frame timing generator 6.

The memory 1 is a n-bit buffer memory such as a shift register for temporarily storing a lower bit rate signal so as to perform bit rate conversion. The lower bit rate signal is written on the memory 1 according to a write address that is generated by the write address counter 2 using a clock $CLK_L$ of the lower bit rate signal. The written signal is read out from the memory 1 according to a read address that is generated by the read address counter 3 using a decimated clock received from the frame timing generator 6.

The readout signal is output to the frame insertion circuit 5, by which necessary information such as overhead, redundancy code, and stuff pulses are inserted according to a frame timing to produce a higher bit rate signal. The frame timing generator 6 generates the decimated clock and the frame timing based on a clock $CLK_R$ of the higher bit rate signal and a fixed stuff insertion instruction as described later.

The write address and the read address are also output to the phase comparator 4. The phase comparator 4 compares the write address and the read address to produce a phase difference M on the memory 1. Since the write address is normally ahead of the read address, a phase difference M is obtained by subtracting the read address from the write address.

Fixed Stuffing Rate Control

The bit rate converter is further provided with a fixed stuffing rate controller 7 and a fixed stuff insertion circuit 8. The fixed stuffing rate controller 7 selects one of a plurality of predetermined fixed stuffing rates depending on a phase difference M received from the phase comparator 4. More specifically, a plurality of threshold values are previously set in the fixed stuffing rate controller 7. The fixed stuffing rate controller 7 selects one of the predetermined fixed stuffing rates depending on a comparison result between each of the threshold values and the phase difference M. In this embodiment, four threshold values TH1$a$, TH2$a$, TH2$b$, and TH1$b$ are previously set (see FIG. 3).

As described later, the predetermined fixed stuffing rates are here three different fixed stuffing rates: $\alpha$, $\beta$, and $\gamma$ ($\gamma<\alpha<\beta$). If a normal fixed stuffing rate $\alpha$ is selected, the cycle of stuff pulse insertion is set to a proper interval and thereby the phase difference M falls Into a proper range because the read clock stops with normal frequency. If a large fixed stuffing rate $\beta$ is selected, the cycle of stuff pulse insertion is shortened and thereby the phase difference M starts increasing on average because the read clock stops more frequently. Contrarily, if a small fixed stuffing rate $\gamma$ is selected, the cycle of stuff pulse insertion elongates and thereby the phase difference M starts decreasing on average because the read clock stops less frequently.

The fixed stuff insertion circuit 8 outputs a fixed stuff insertion instruction corresponding to the selected fixed stuffing rate to the frame insertion circuit 5 and the frame timing generator 6.

The frame timing generator 6 receives the fixed stuff insertion instruction and the clock $CLK_K$ of the high bit rate signal to output a decimated clock to the read address counter 3 and an insertion timing clock to the frame insertion circuit 5. The decimated clock is obtained by removing clock pulses corresponding to the inserted information including the overhead, redundancy code and stuff pulses from the higher bit rate clock $CLK_B$ of a frame. Accordingly, the frame insertion circuit 5 inserts the overhead and the redundancy code into the readout signal and further stuff pulses into the readout signal according to the insertion timing clock.

Figure 2:
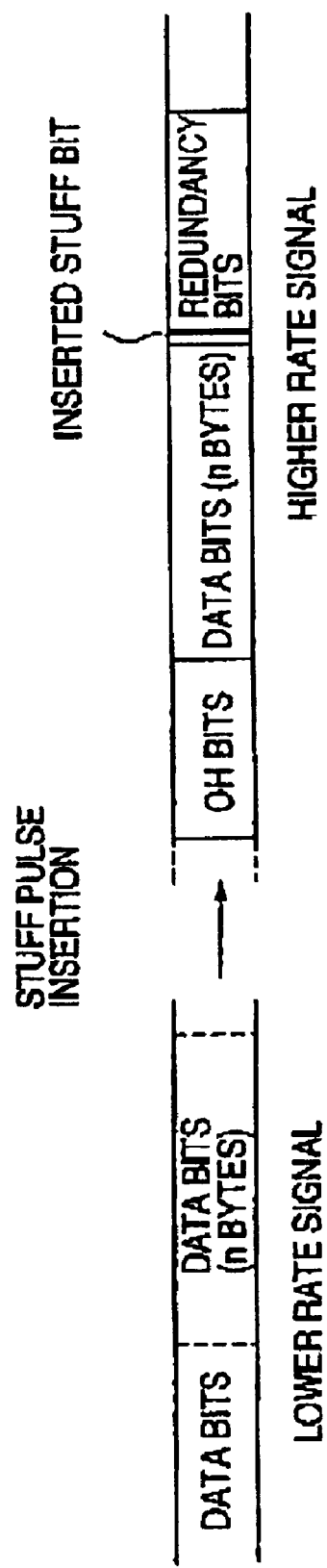
FIG. 2 is a schematic diagram showing insertion of a stuff bit in a higher bit rate signal according to the present invention.

As shown in FIG. 2, the overhead and the redundancy code are inserted into predetermined positions in each frame of the higher bit rate signal, respectively. In addition, a stuff pulse is also inserted into the readout signal in a controlled cycle determined by the selected fixed stuffing rate.

Figure 3:
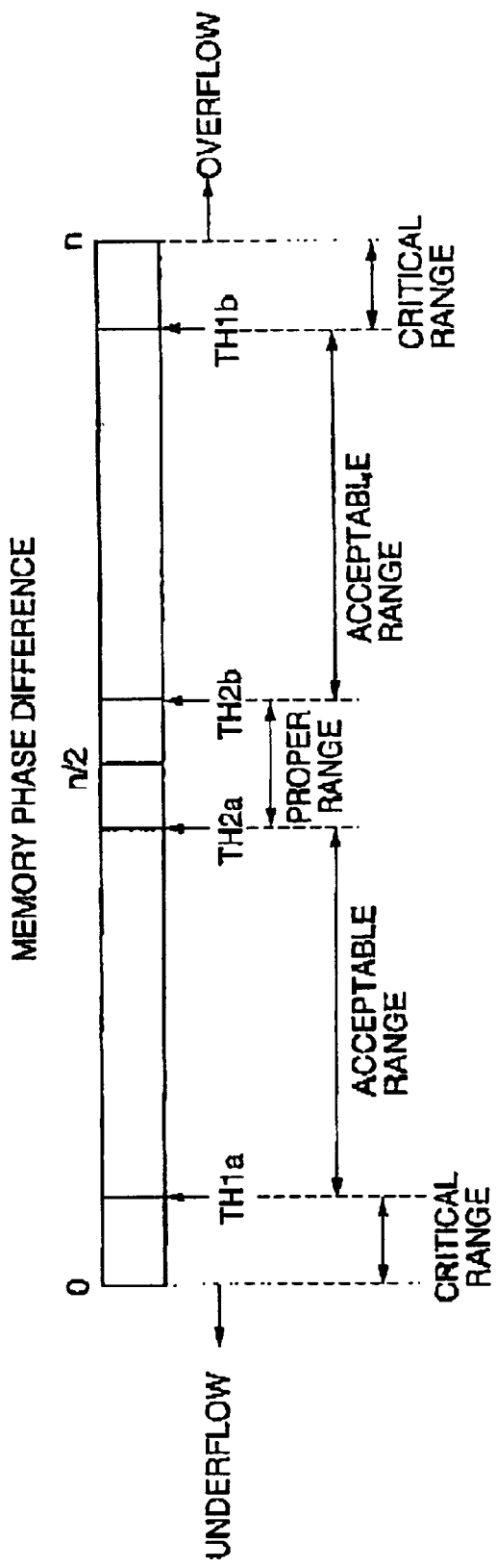
FIG. 3 is a diagram showing threshold values used to determine how to change a stuffing rate according to the first embodiment.

Referring to FIG. 3, four threshold values TH1$a$, TH2$a$, TH2$b$, and TH1$b$ are previously set such that TH1$a$<TH2$a$<TH2$b$<TH1$b$. A range from TH2$a$ to TH2$b$ is set to a proper range having a center phase difference of n/2. A range from TH1$a$ to TH2$a$ is set to an acceptable range and a range from 0 to TH1$a$ is set to a critical range. A range from TH2$b$ to TH1$b$ is set to an acceptable range and a range from TH1$b$ to n is set to a critical range. The fixed stuffing rate controller 7 controls a fixed stuffing rate depending on which of the allocated ranges a current phase difference falls into. The details of the fixed stuffing rate control operation will be described hereafter with reference to FIGS. 4–7.

Figure 5A:
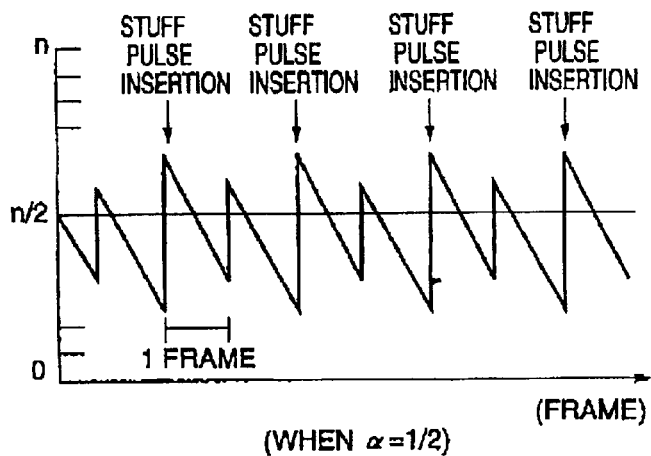
FIG. 5A is a diagram showing a time-varying phase difference in a normal status when a stuffing rate is set to $\alpha=\frac{1}{2}$.
Figure 5B:
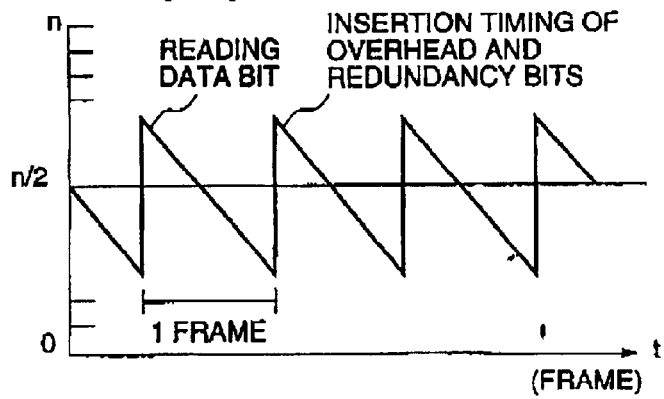
FIG. 5B is a diagram showing a time-varying phase difference in a normal status in a conventional bit rate converter.

Referring to FIG. 4, when a phase difference M falls into one of the acceptable or proper ranges, that is, TH1$a$<M<TH1$b$, the fixed stuffing rate controller 7 selects the normal fixed stuffing rate $\alpha$ (step S1). In the case where no external noise occurs, the phase difference M periodically varies within the depth (n) of the memory 1 having a center of n/2 as shown in FIG. 5A. Accordingly, no data slips away. In the normal status as shown in FIG. 5A, since the fixed stuffing rate is set to $\alpha=\frac{1}{2}$, the stuff pulse insertion is performed every two frames. In other words, the normal fixed stuffing rate $\alpha$ is kept as long as TH1$a$<M<TH1$b$ (step S2).

Figure 6A:
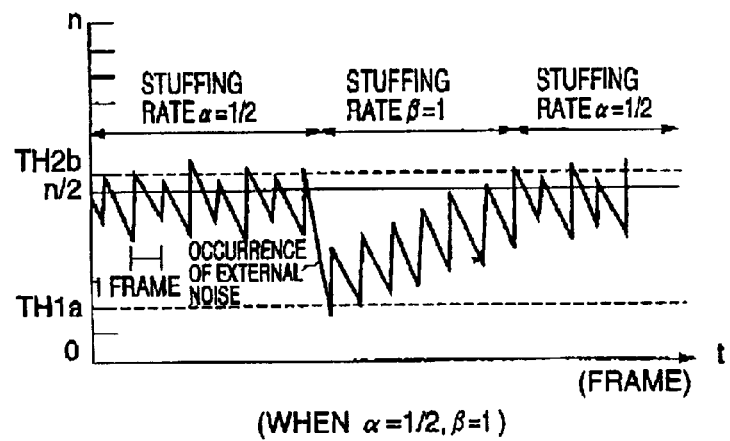
FIG. 6A is a diagram showing a time-varying phase difference in the first embodiment in a case where a write clock stops due to external noise when a stuffing rate is set to $\alpha=\frac{1}{2}$ or $\beta=1$.
Figure 6B:
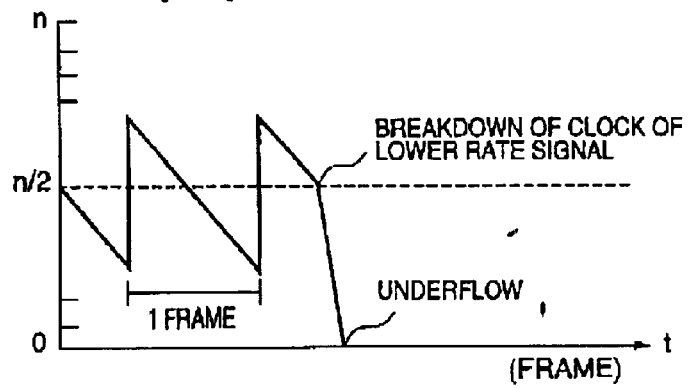
FIG. 6B is a diagram showing a time-varying phase difference in a case where a write clock stops in a conventional bit rate converter.

When a phase difference M shifts toward underflow to enter a critical region (M<TH1$a$ in step S2) due to occurrence of external noise such as jitter, wander, or phase jump as shown in FIG. 6A, the fixed stuffing rate controller 7 changes the normal fixed stuffing rate from $\alpha$ to $\beta$ (step S3).

As shown in FIG. 6A, since the selected normal fixed stuffing rate $\beta$ is greater than the previous fixed stuffing rate $\alpha$, the cycle of stuff pulse insertion is shortened and thereby the phase difference M gradually increases toward the center value of n/2 on average because the read clock stops more frequently. Here, since the fixed stuffing rate is set to $\beta=1$, the stuff pulse insertion is executed every frame. Thereafter, when the phase difference M exceeds the threshold TH2$b$ (TH2$b$<M in step S4), the fixed stuffing rate controller 7 sets the fixed stuffing rate back to $\alpha=\frac{1}{2}$ (step S1). Unless the phase difference M exceeds the threshold TH2$b$ (TH2$b$>M in step S4), the selected normal fixed stuffing rate $\beta$ is maintained.

Figure 7A:
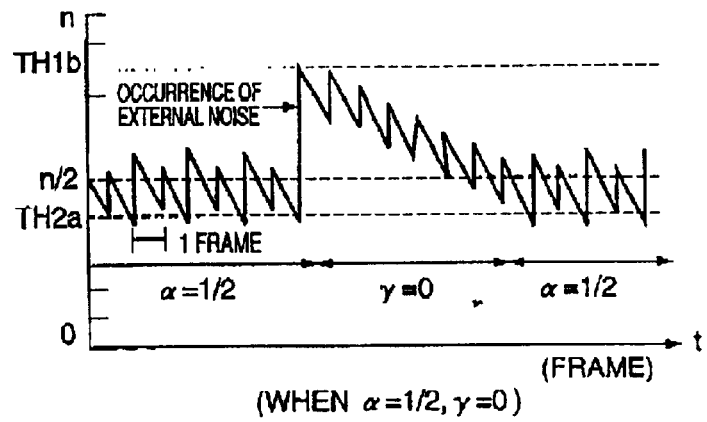
FIG. 7A is a diagram showing a time-varying phase difference in the first embodiment in a case where a write clock increases in frequency due to external noise when a stuffing rate is set to $\alpha=\frac{1}{2}$ or $\beta=1$.
Figure 7B:
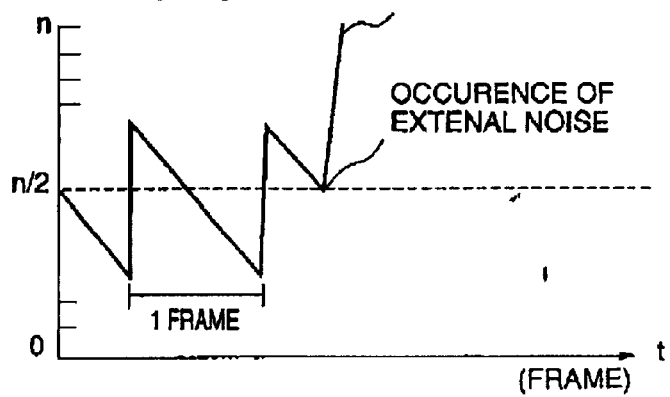
FIG. 7B is a diagram showing a time-varying phase difference in a case where a write clock increases in frequency in a conventional bit rate converter.

When a phase difference M shifts toward overflow to enter a critical region (M>TH1$b$ in step S2) due to occurrence of external noise as shown in FIG. 7A, the fixed stuffing rate controller 7 changes the normal fixed stuffing rate from $\alpha$ to $\gamma$ (step S5).

As shown in FIG. 7A, since the selected normal fixed stuffing rate $\gamma$ is smaller than the previous fixed stuffing rate $\alpha$, the cycle of stuff pulse insertion is elongated and thereby the phase difference M gradually decreases toward the center value of n/2 on average because the read clock stops less frequently. Here, since the fixed stuffing rate is set to $\gamma=0$, the stuff pulse insertion is not executed. Thereafter, when the phase difference M becomes smaller than the threshold TH2$a$ (TH2$a$>M in step S6), the fixed stuffing rate controller 7 sets the fixed stuffing rate back to $\alpha$ (step S1). When the phase difference M is not smaller than the threshold TH2$a$ (TH2$a$<M in step S6), the selected normal fixed stuffing rate $\gamma$ is maintained.

In this manner, a phase difference M is monitored at all times and the stuff pulse insertion is normally executed at the fixed stuffing rate $\alpha$. When the phase difference M is about to underflow, the stuff pulse insertion is executed at the larger fixed stuffing rate $\beta$. When the phase difference M is about to overflow, the stuff pulse insertion is executed at the smaller fixed stuffing rate $\gamma$. Accordingly, by controlling the fixed stuffing rate, the phase difference M can be continuously restored to the vicinity of the center of n/2 without the need of memory reset. In other words, the data stored in the memory 1 can be prevented from destroying due to memory reset, resulting in improved robustness.

Second Embodiment

Figure 8:
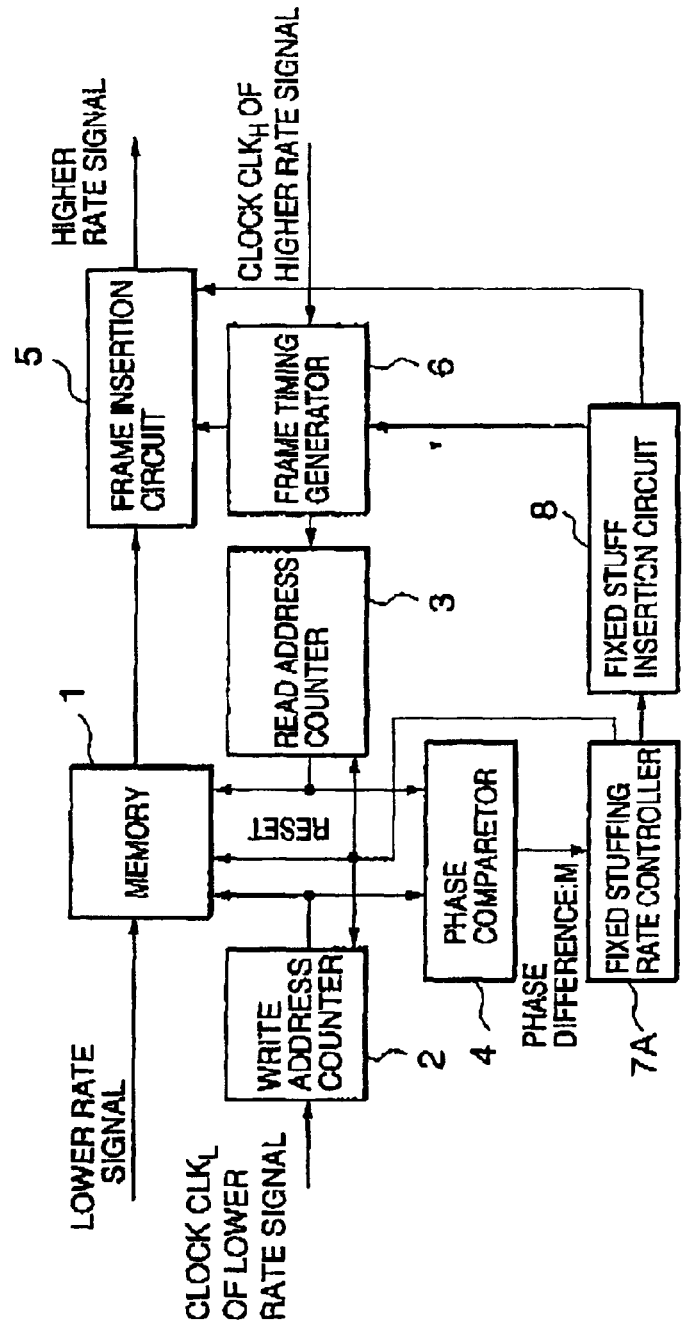
FIG. 8 is a block diagram showing a bit rate converter according to a second embodiment of the present invention.

Referring to FIG. 8, the circuit configuration of a bit rate converter according to a second embodiment is the same as that of the first embodiment as shown in FIG. 1 except that a fixed stuffing rate controller 7A can forcefully reset the memory 1, the write address counter 2, and the read address counter 3. Therefore, circuit blocks similar to those previously described with reference to FIG. 1 are denoted by the same reference numerals and their descriptions are omitted.

Figure 9:
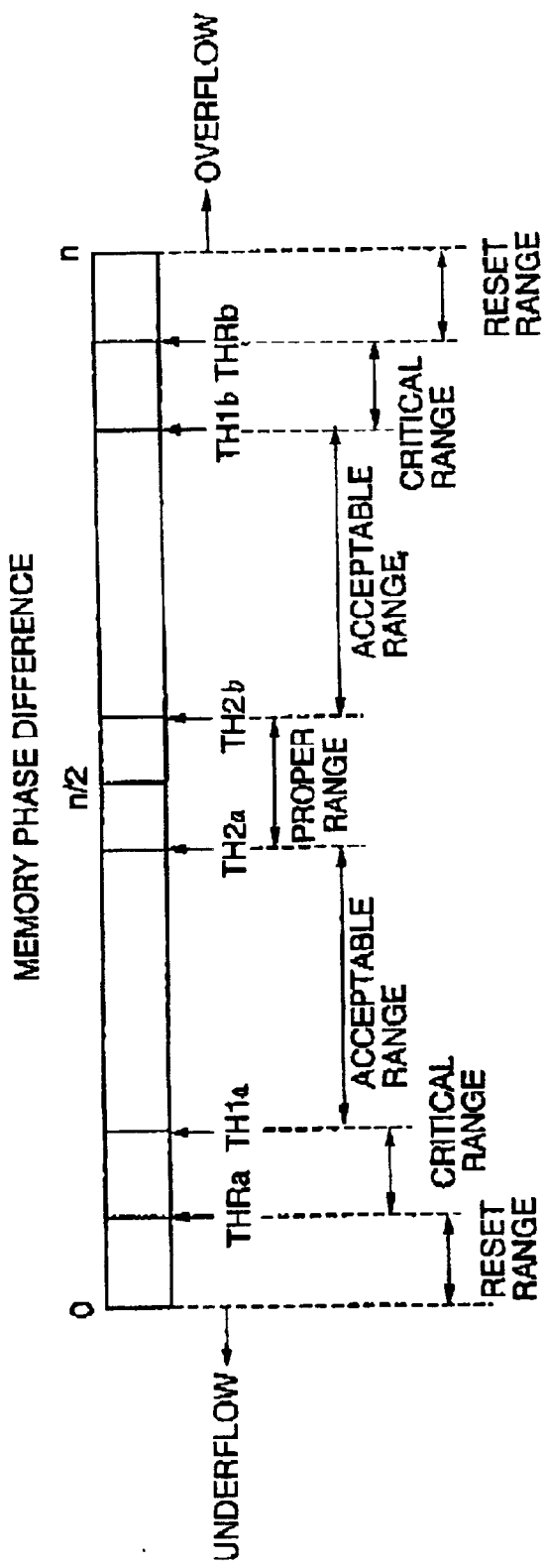
FIG. 9 is a diagram showing threshold values used to determine how to change a stuffing rate according to the second embodiment.

Referring to FIG. 9, six threshold values THRa, TH1$a$, TH2$a$, TH2$b$, TH1$b$, and THRb are previously set such that THRa<TH1$a$<TH2$a$<TH2$b$<TH1$b$<THRb. A range from TH2$a$ to TH2$b$ is set to a proper range having a center phase difference of n/2. A range from TH1$a$ to TH2$a$ is set to an acceptable range, a range from THRa to TH1$a$ is set to a critical range, and a range from 0 to THRa is set to a reset trigger range. Similarly, a range from TH2$b$ to TH1$b$ is set to an acceptable range, a range from TH1$b$ to THRb is set to a critical range, and a range from THRb to n is set to a reset trigger range. The fixed stuffing rate controller 7 controls a fixed stuffing rate depending on which of the allocated ranges a current phase difference falls into.

When a phase difference M falls into the range from THRa to THRb, the fixed stuffing rate controller 7A performs the same control as in the first embodiment. If the phase difference M shifts into the reset trigger range due to the occurrence of a high-level noise, then the fixed stuffing rate controller 7A does not execute selection of fixed stuffing rates but trigger a reset of the memory 1, the write address counter 2, and the read address counter 3 so as to reset the phase difference to the center value of n/2.

Figure 10:
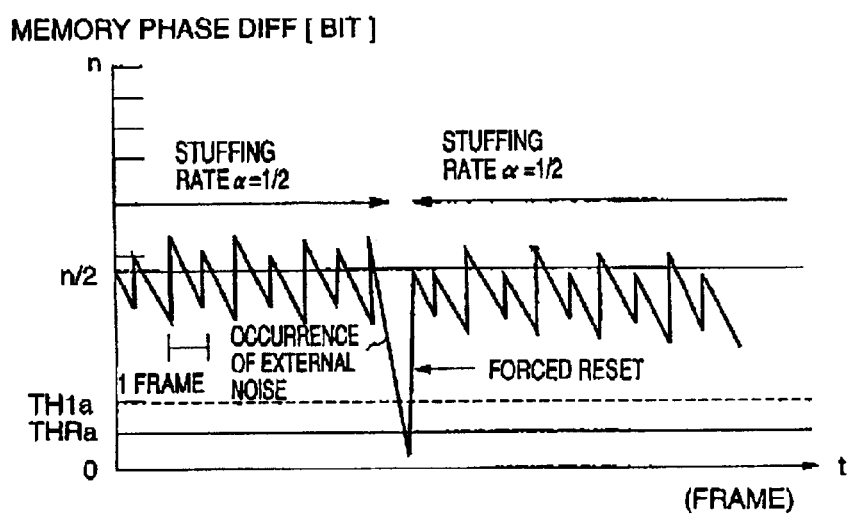
FIG. 10 is a diagram showing a time-varying phase difference in the second embodiment in a case where a write clock stops due to external noise when a stuffing rate is set to $\alpha=\frac{1}{2}$ or $\beta=1$.

As shown in FIG. 10, when a phase difference M shifts toward underflow to enter the reset trigger region (M<THRa). the fixed stuffing rate controller 7A forcefully resets the memory 1, the write address counter 2, and the read address counter 3 so as to reset the phase difference M back to the center value of n/2.

Figure 11:
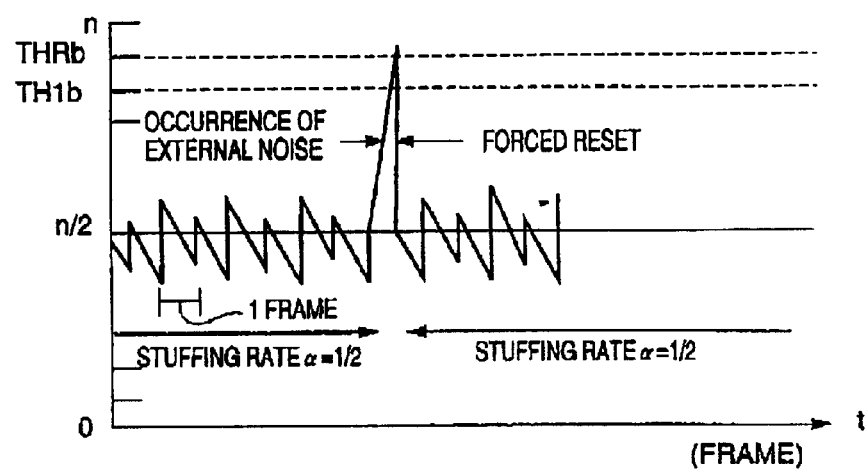
FIG. 11 is a diagram showing a time-varying phase difference in the second embodiment in a case where a write clock increases in frequency due to external noise when a stuffing rate is set to $\alpha=\frac{1}{2}$ or $\beta=1$.

As shown in FIG. 11, when a phase difference M shifts toward overflow to enter the reset trigger region (M>THRb), the fixed stuffing rate controller 7A forcefully resets the memory 1, the write address counter 2, and the read address counter 3 so as to reset the phase difference M back to the center value of n/2.

In the event that a very large variation in phase difference occurs such that selection of fixed stuffing rates cannot cope with the variation, the phase difference M can go back to proper values immediately. In this case, although data stored in the memory 1 are destroyed, the circuit operation can be restored Immediately after such a very large noise causes an unusual change of the phase difference, resulting in enhanced reliability.

We claim:

1. A bit rate converter, comprising:
a memory for storing input data of a fixed bit rate;
a memory controller for writing the input data sequentially into the memory according to a write clock and reading out data from the memory sequentially according to a read clock having a frequency different from that of the write clock;
a phase comparator for comparing a write address of the memory and a read address of the memory to determine a phase difference, wherein the write address is ahead of the read address in the memory;
a stuffing rate controller for selecting one of a plurality of preset fixed stuffing rates depending on the phase difference; and
a stuff pulse inserter for inserting a stuff pulse into readout data from the memory at the selected stuffing rate, wherein:
the plurality of preset fixed stuffing rates comprises a normal fixed stuffing rate, a higher fixed stuffing rate, and a lower fixed stuffing rate, and
the stuffing rate controller normally selects the normal fixed stuffing rate, selects the higher fixed stuffing rate when the phase difference is smaller than a first threshold value, and selects the lower fixed stuffing rate when the phase difference is greater than a second threshold value that is greater that the first threshold value.

2. The bit rate converter according to claim 1, wherein:
the stuffing rate controller is provided with a plurality of threshold values, including a lowest threshold value and a highest threshold value, and
the stuffing rate controller resets the memory and the memory controller when the phase difference exceeds one of the lowest threshold value and highest threshold value.

3. A bit rate converter, comprising:
a memory for storing input data having a fixed bit rate;
a memory controller for writing the input data sequentially into the memory according to a write clock and reading out data from the memory sequentially according to a read clock having a frequency different from that of the write clock;
a phase comparator for comparing a write address of the memory and a read address of the memory to determine a phase difference, wherein the write address is ahead of the read address in the memory;
a stuffing rate controller for selecting one of a plurality of preset fixed stuffing rates depending on the phase difference; and
a stuff pulse inserter for inserting a stuff pulse into readout data from the memory at the selected stuffing rate, wherein:
the stuffing rate controller is provided with a plurality of threshold values, including a low threshold value and a high threshold value,
the plurality of preset fixed stuffing rates comprises a normal fixed stuffing rate, a higher fixed stuffing rate, and a lower fixed stuffing rate, and
the stuffing rate controller normally selects the normal fixed stuffing rate, selects the higher fixed stuffing rate when the phase difference is smaller than the low threshold value, and selects the lower fixed stuffing rate when the phase difference is greater than the high threshold value.

4. The bit rate converter according to claim 3, wherein:
the plurality of threshold values, further includes a lowest threshold value and a highest threshold value, and
the stuffing rate controller resets the memory and the memory controller when the phase difference exceeds one of the lowest threshold value and highest threshold value.

5. A bit rate converter comprising:
a memory for storing input data having a fixed bit rate;
a write address counter for counting a write address according to a write clock signal having the fixed bit rate;

a read address counter for counting a read address according to a read clock signal, wherein the write address is ahead of the address;

a memory controller for writing the input data sequentially into the memory according to the write address and reading the data sequentially out from the memory according to the read address;

a phase comparator for comparing the write address and the read address to determine a phase difference;

a stuffing rate controller for selecting one of a plurality of preset fixed stuffing rates depending on the phase difference;

a stuff pulse inserter for inserting a stuff pulse into readout data in frames from the memory at the selected stuffing rate; and a read clock generator for generating the read clock by decimating a clock pulse corresponding to the stuff pulse from a clock having a higher bit rate, wherein:

the plurality of preset fixed stuffing rates comprises a normal fixed stuffing rate, a higher fixed stuffing rate, and a lower fixed rate, and the stuffing rate controller normally selects the normal fixed stuffing rate, a higher fixed stuffing rate when the phase difference is smaller than a first threshold value, and selects the lower fixed stuffing rate when the phase difference is greater than a second threshold value that is greater than the first threshold value.

6. The bit rate converter according to claim 5, wherein:

the stuffing rate controller stores a plurality of threshold values, including a lowest threshold value and a highest threshold value, and the stuffing rate controller resets the memory and the memory controller when the phase difference exceeds one of the lowest threshold value and highest threshold value.

7. A method according to claim 7, for use in a bit rate converter including a memory for storing input data having a fixed bit rate, and a memory controller for writing the input data sequentially into the memory according to a write clock and reading out data from the memory sequentially according to a read clock, said method comprising:

comparing a write address of the memory and a read address of the memory to determine a phase difference, wherein the write address is aheac of the read address in the memory;

selecting one of a plurality of preset fixed stuffing rates depending on the phase difference; and inserting a stuff pulse into readout data from the memory at the selected stuffing rate, wherein;

plurality of preset fixed stuffing rates includes a normal fixed stuffing rate, a higher fixed stuffing rate, and a lower fixed stuffing rate;

when the input data is normally received, the one of the plurality of preset fixed stuffling rates is selected by selecting the normal fixed stuffing rate;

when the phase difference is smaller than a first threshold value, the one of the plurality of preset fixed stuffing rates is selected by selecting the higher fixed stuffing rate; and when the phase difference is greater than a second threshold value that is greater than the first threshold value, the one of the plurality of preset fixed stuffing rates is selected by selecting the lower fixed stuffing rate.

8. The method according to claim 7, further comprising:

storing a plurality of threshold values, including a lowest threshold value, a lower threshold value, a higher threshold value, and a highest threshold value, in the memory; and resetting the memory and the memory controller when the phase difference exceeds one of the lowest threshold value and highest threshold value, wherein:

the lower threshold value is the first threshold value, and the higher threshold value is the second threshold value.

9. The method according to claim 7, wherein the plurality of preset fixed stuffing rates is further selected by:

when the phase difference exceeds the higher threshold value after the higher fixed stuffing rate has been selected, selecting the normal fixed stuffing rate; and when the phase difference is lower than the lower threshold value after the lower fixed stuffing rate has been selected, selecting the normal fixed stuffing rate.

10. A method for use in a bit rate converter including a memory for storing input data having a fixed bit rate, and a memory controller for writing the input data sequentially into the memory according to a write clock and reading out data from the memory sequentially according to a read clock, said method comprising:

comparing a write address of the memory and a read address of the memory to determine a phase difference, wherein the write address is ahead of the read address in the memory;

selecting one of a plurality of preset fixed stuffing rates depending on the phase difference;

storing a plurality of threshold values, including a lower threshold value and a higher threshold value, in the memory; and inserting a stuff pulse into readout data from the memory at the selected stuffing rate, wherein:

the plurality of preset fixed stuffing rate includes a normal fixed stuffing rate, a higher fixed stuffing rates and a lower fixed stuffing rate, when the input data is normally received, the one of the plurality of preset fixed stuffing rates is selected by selecting the normal fixed stuffing rate;

when the phase difference is smaller than the lower threshold value, the one of the plurality of preset fixed stuffing rates is selected by selecting the higher fixed stuffing rate; and when the phase difference is greater than the higher threshold value, the one of the plurality of preset fixed stuffing rates is selected by selecting the lower fixed stuffing rate.

11. The method according to claim 10, wherein:

when the phase difference exceeds the higher threshold value after the higher fixed stuffing rate has been selected, the one of the plurality of preset fixed stuffing rates is further selected by selecting the normal fixed stuffing rate; and when the phase difference is lower than the lower threshold value after the lower fixed stuffing rate has been selected, the one plurality of preset fixed stuffing rates is further selected by selecting the normal fixed stuffing rate.

12. The method according to claim 10, wherein:

the threshold values further include a lowest threshold value and a highest threshold value, and the method further comprises resetting the memory and the memory controller when the phase difference exceeds one of the lowest threshold value and highest threshold value.

13. A bit rate converter, comprising:

a memory controller fur writing the input data sequentially into a memory according to a write clock and reading out data from the memory sequentially according to a read clock having a frequency different from that of the write clock;

a phase comparator for comparing a write address of the memory and a read address of the memory to determine a phase difference, wherein the write address is ahead of the read address in the memory;

a stuffing rate controller for selecting one of a plurality of preset fixed stuffing rates, including a normal fixed stuffing rate, a higher fixed stuffing rate, and a lower fixed stuffing rate, depending on the phase difference; and a stuff pulse inserter for inserting a stuff pulse into readout data from the memory at the selected stuffing rate, wherein:

the stuffing rate controller is provided with a plurality of threshold values, including a lowest threshold value, a lower threshold value, a higher threshold value, and a highest threshold value, the stuffing rate controller resets the memory and the memory controller when the phase difference exceeds one of the lowest threshold value and highest threshold value, and the stuffing rate controller normally selects the normal fixed stuffing rate, selects the higher fixed stuffing rate when the phase difference is smaller than the lower threshold value, and selects the lower fixed stuffing rate when the phase difference is greater than the higher threshold value.

14. A bit rate converter comprising:

a write address counter for counting a write address according to a write clock signal having a fixed bit rate;

a read address counter for counting a read address according to a read clock signal, wherein the write address is ahead of the read address;

a memory controller for writing the input data sequentially into a memory according to the write address and reading the data sequentially out from the memory according to the read address;

a phase comparator for comparing the write address and the read address to determine a phase difference;

a stuffing rate controller for selecting one of a plurality of preset fixed stuffing rates depending on the phase difference;

a stuff pulse inserter for inserting a stuff pulse into readout data in frames from the memory at the selected stuffing rate; and a read clock generator for generating the read clock by decimating a clock pulse corresponding to the stuff pulse from a clock of a higher bit rate, wherein:

the stuffing rate controller is provided with a plurality of threshold values, including a low threshold value and a high threshold value, the plurality of preset fixed stuffing rates comprises a normal fixed stuffing rate, a higher fixed stuffing rate, and a lower fixed stuffing rate, and the stuffing rate controller normally selects the normal fixed stuffing rate, selects the higher fixed stuffing rate when the phase difference is smaller than the low threshold value, and selects the lower fixed stuffing rate when the phase difference is greater than the high threshold value.

15. The bit rate converter according to claim 14, wherein:

the stuffing rate controller stores a plurality of threshold values, including a lowest threshold value and a highest threshold value, and the stuffing rate controller resets the memory and the memory controller when the phase difference exceeds one of the lowest threshold value and highest threshold value.

16. A bit rate converter, comprising:

a memory for storing input data sequentially according to a write clock and reading out data therefrom sequentially according to a read clock having a frequency different from that of the write clock;

a stuffing rate controller for selecting one of a plurality of preset fixed stuffing rates, including a normal fixed stuffing rate, a higher fixed stuffing rate, and a lower fixed stuffing rate, depending on a phase difference between a write address of the memory and a read address of the memory; and a stuff pulse inserter for inserting a stuff pulse into readout data from the memory at the selected stuffing rate, wherein:

the stuffing rate controller is provided with a plurality of threshold values, including a low threshold value and a high threshold value, and the stuffing rate controller normally selects the normal fixed stuffing rate, selects the higher fixed stuffing rate when the phase difference is smaller than the low threshold value, and selects the lower fixed stuffing rate when the phase difference is greater than the high threshold value.

17. The bit rate converter according to claim 16, wherein:

the plurality of threshold values further includes a lowest threshold value and a highest threshold value, and the stuffing rate controller resets the memory and the memory controller when the phase difference exceeds one of the lowest threshold value and highest threshold value.

* * * * *